United States Patent [19]
Sunlin et al.

[11] Patent Number: 5,900,833
[45] Date of Patent: May 4, 1999

[54] IMAGING RADAR SUITABLE FOR MATERIAL PENETRATION

[75] Inventors: William M. Sunlin, San Jose; Charles E. Heger, Saratoga, both of Calif.

[73] Assignee: Zircon Corporation, Campbell, Calif.

[21] Appl. No.: 08/901,470

[22] Filed: Jul. 28, 1997

Related U.S. Application Data

[63] Continuation of application No. 08/839,663, Apr. 14, 1997
[60] Provisional application No. 60/015,548, Apr. 16, 1996.

[51] Int. Cl.$^6$ .............................. G01S 13/04; G01S 13/90
[52] U.S. Cl. ................................................ 342/22; 342/25
[58] Field of Search .................................. 342/22, 21, 25

[56] References Cited

U.S. PATENT DOCUMENTS

| | | | |
|---|---|---|---|
| 4,675,677 | 6/1987 | von Maydell et al. | 342/25 |
| 4,937,580 | 6/1990 | Wills | 342/22 |
| 4,965,582 | 10/1990 | Hellsten | 342/25 |
| 5,294,933 | 3/1994 | Lee et al. | 342/159 |
| 5,334,980 | 8/1994 | Decker | 342/25 |
| 5,381,151 | 1/1995 | Boles et al. | 342/21 |
| 5,394,151 | 2/1995 | Knaell et al. | 342/25 |
| 5,469,167 | 11/1995 | Polge et al. | 342/25 |
| 5,502,444 | 3/1996 | Kohlberg | 342/22 |
| 5,673,050 | 9/1997 | Moussally et al. | 342/22 |

FOREIGN PATENT DOCUMENTS

| | | |
|---|---|---|
| 565047 A1 | 10/1993 | European Pat. Off. |
| 0147829 A2 | 7/1985 | Japan |
| 493598 B1 | 7/1992 | Japan |
| WO 95/21387 | 8/1995 | WIPO |

*Primary Examiner*—John B. Sotomayor
*Attorney, Agent, or Firm*—Skjerven, Morrill, MacPherson, Franklin & Friel LLP; Norman R. Klivans; Hugh H. Matsubayashi

[57] ABSTRACT

A ground penetrating impulse radar system provides three-dimensional images of targets. A moving array of transmitting and receiving antennas provides narrow beamwidths and high gain by real and synthetic aperture beam processing. Narrow pulsewidth impulse signals are utilized to obtain high resolution. Round trip time is calculated for each three-dimensional pixel in a search volume, and is used to process three dimensional imagery. Analog to digital conversion can be utilized, so all signal processing is accomplished digitally. The radar system is applicable to detecting small objects near the surface by using very narrow pulses, and also can be applied to detect large, deep objects by wider pulses.

29 Claims, 5 Drawing Sheets

1

IMAGING RADAR SUITABLE FOR MATERIAL PENETRATION

CROSS REFERENCE TO RELATED APPLICATIONS

This application is a continuation of U.S. application Ser. No. 08/839,663, pending, filed Apr. 14, 1997, by William M. Sunlin which claims priority to U.S. provisional application Ser. No. 60/015,548, filed Apr. 16, 1996 by William M. Sunlin, entitled "An Imaging Ground Penetrating Radar".

FIELD OF THE INVENTION

This invention relates to a method and apparatus for locating objects, e.g. under the surface of the ground or within other materials, utilizing impulse radar, and more specifically to three dimensional imaging for buried objects using impulse radar.

BACKGROUND

There has been a recognized need for ground penetrating radars (GPR) to locate, map, identify and image underground objects. Numerous applications for ground penetrating radars exist in both civilian and military applications. Civilian applications include road surface assessment, underground utility mapping, geophysical exploration, environmental surveys, road and bridge surface evaluation, archaeological exploration, and building wall (or other structural element) internal investigation. Military applications include land mine detection, explosive ordnance disposal, and underground bunker location; there are many other applications. Some of these applications are served by human portable ground-based system, some by vehicle carried mobile ground-based systems, and others by airborne systems.

The potential benefits of GPR has spurred numerous design and systems approaches. Initially these were centered on continuous wave system approaches including frequency modulated continuous wave (FMCW) and pulsed frequency modulated (PFM) approaches. Physical size limits the number of antennas, so the array gain is low, resulting in inadequate resolution and low penetration into the ground. The systems are wideband, which limits the coherent processing of an underground return. As a result, target imaging, detectability, and false alarm capabilities are below those desired.

Current ground based portable GPRs generally require that the antennas be in contact with the ground. This limits applicability to suitable terrain, and the requirement to reposition the antennas is very time consuming.

Airborne Side Looking radars are known utilizing synthetic aperture beam processing, resulting in excellent two-dimensional resolution; however this approach is not suitable for ground penetrating radar, where a three-dimensional image is required.

More recently, impulse radar (also known as ultrawideband radar) has been used in ground penetrating radar. Impulse radars and various applications for them are well known; see e.g. U.S. Pat. Nos. 5,361,070 to McEwan; 5,589,838 to McEwan; 5,523,760 to McEwan; and 5,517, 198 to McEwan, all incorporated herein by reference. Impulse radars utilize the time, rather than the frequency domain, transmitting a single pulse rather than a train of sinusoidal signals, and have advantages over frequency based radar systems. The pulse width (duration) can be varied to match target size and depth characteristics. Impulse radar lends itself to digital rather than analog processing. Current GPR designs using this approach have several disadvantages, however. Systems that utilize large antenna arrays to achieve the desired resolution require a large number of antenna elements and the required electronic beam steering system is very complicated. Systems that scan each element of the three-dimensional search space require extreme amounts of data to be processed, resulting in severe processing requirements.

A need exists for a radar for penetrating ground or other material (e.g. water, building walls, etc.) that has improved resolution and depth capability and which can provide three dimensional imaging capability. There is a need for such a radar for portable, mobile, and airborne applications. Applications range from detecting small objects near the surface of the ground (or other material) to those that detect large objects buried deeply.

SUMMARY

This invention is directed to impulse radar using an array of transmitting and receiving antennas. The signal return from each transmitting antenna is collected and digitized at each receiving antenna. The returned signal is stored in a memory, and also can be stored in a data storage recorder for later processing.

A set of three dimensional pixels defines the search volume. For real time processing, the path delay from each transmitting antenna to each pixel and back to each receiving antenna is calculated. The contents of the memory elements corresponding to these delays are summed. This summation (integration) across the antennas is equivalent to real array beam processing.

The antenna array moves across and above the surface of e.g. the ground (or other material to be searched). The signal returns relating to each pixel are also summed as the array moves across the ground. This approach provides synthetic aperture beams which lends itself to parallel processing, which simplifies digital processor requirements.

The combination of real and synthetic aperture beam processing results in very high antenna array gain and narrow beam widths, improving capabilities of deeper penetration into the material, higher resolution, and improved rejection of ground clutter. The result is a three dimensional image of the underground target area. The processed output may be viewed on a display which uses color to permit a visualization of the three-dimensional image.

In one application the transmitting and receiving antennas are arranged in a linear array which permits simple installation across the line of motion, and is suitable for portable, mobile, or airborne systems.

DETAILED DESCRIPTION

Figure 1:
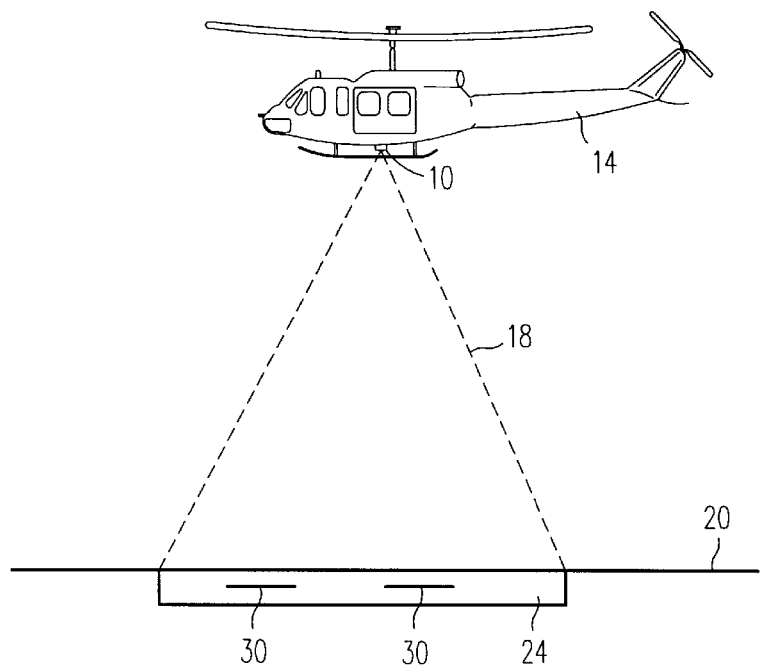
FIG. 1 shows application of the present system as a helicopter based ground penetrating radar system.
Figure 2:
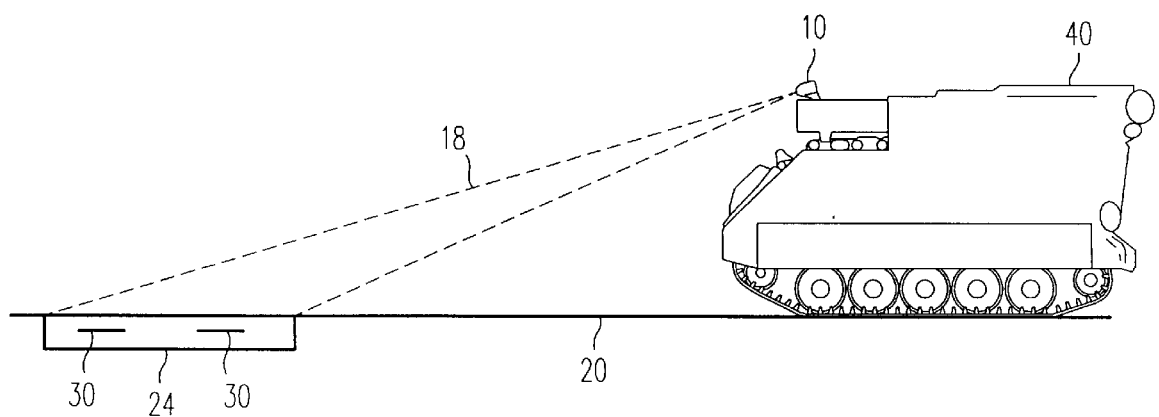
FIG. 2 shows application of the present system as a mobile mine detection system.

The present radar system is suitable for portable, mobile (vehicular), and airborne applications. FIG. 1 shows a helicopter mounted system, where the system (not shown in detail) is a radar system unit 10 mounted on a helicopter 14 and beaming pulses (shown by their envelope 18) towards the ground surface 20 so to scan a search volume 24 in which are present buried objects 30 e.g. land mines or concrete structures. FIG. 2 shows a mobile (vehicle-mounted) mine-hunting application where the search volume 24 is ahead of the vehicle 40 on which radar system unit 10 is mounted, for beaming pulses 44 towards search volume 24.

Figure 3:
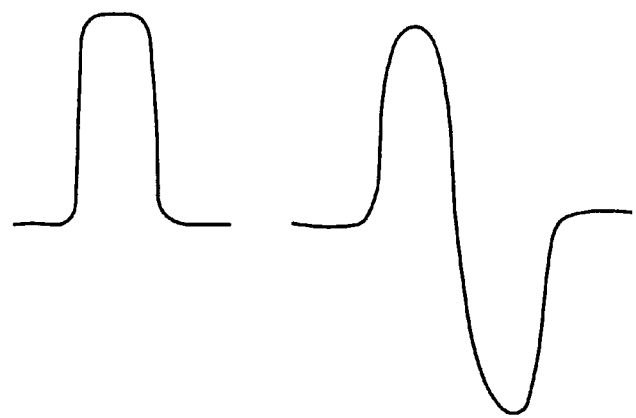
FIG. 3 shows a typical pulse applied to a transmit antenna and a typical received pulse at the receive antenna.

The present radar system utilizes the well known impulse radar referred to above, where an impulse rather than a burst of radio frequency energy is transmitted. FIG. 3 shows diagrammatically (left side) a typical pulse that is applied to the transmitting antenna and (right side) a typical pulse at the output terminal of a receiving antenna of the radar system.

Figure 4:
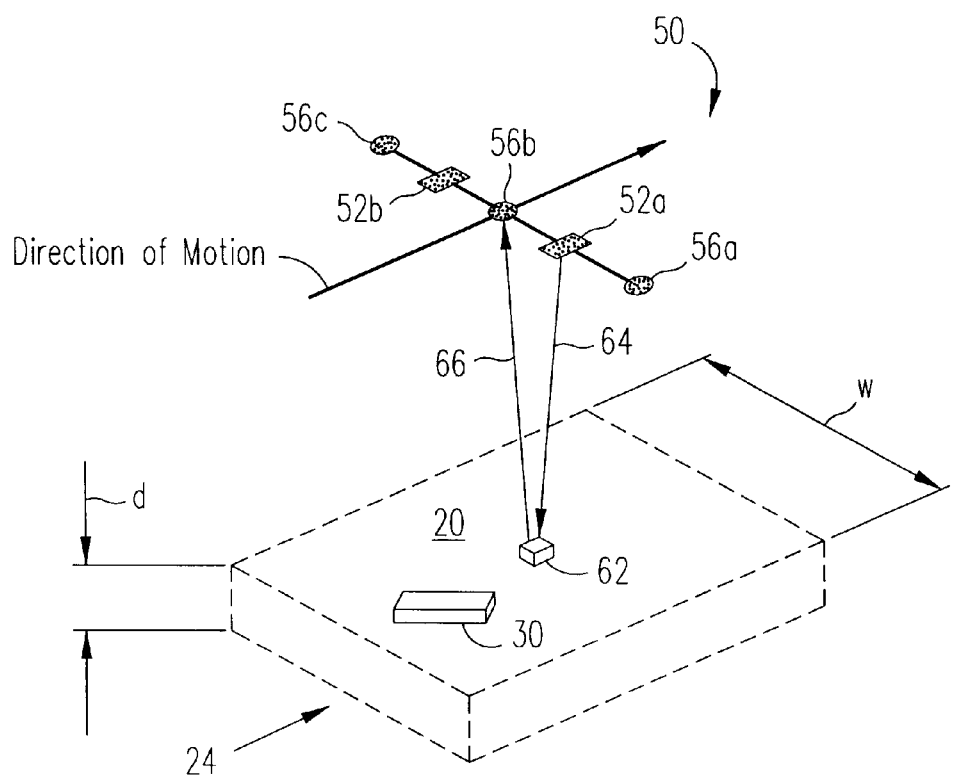
FIG. 4 is a diagram illustrating operation of the present system.

Operation of the present radar system is shown in FIG. 4. An array 50 of one or more transmitting antennas 52a, 52b and one or more receiving antennas 56a, 56b, 56c moves across and above the surface 20 of the earth as shown. (The movement is achieved by flying the helicopter or driving the vehicle or manually in a handheld system). The antennas may be arrayed in line as shown, or in any non-linear fixed configuration movable as a unit 50. Although one application in FIG. 4 is pictured moving above the earth (or water), it is also applicable for searching in other materials such as (but not limited to) building floors, ceilings and walls, or roads, bridges, etc.

An active search volume 24 exists below the antenna array 50. This volume 24 is defined as a plurality of "pixels" arranged in three dimensions; only one representative pixel 62 is shown. For a typical airborne radar system, each pixel 62 is a volume of space that measures e.g. 3×3×3 inches, and the active search volume 24 measures e.g. 30 feet (120 pixels) long, by 30 feet (120 pixels) wide, by 10 feet (40 pixels) deep. The antenna array dimensions are selected to provide adequate resolution to define individual pixels in the dimension across the width of the search volume. The beamwidth of each antenna is selected to provide coverage of the entire search volume. The depth d of the search volume depends inter alia on the width of the transmitted pulses which affect the loss characteristics of the particular material (e.g. earth) being searched, the power of the transmitted pulses, as well as the transmitted and receiving antenna and associated array grains, in addition to the usual radar performance factors.

A swath having such a width w of e.g. 30 feet is thereby searched as the antenna array 50 moves over the search volume 24. The radar system collects the return signals 66 resulting from the transmitted energy 64 being reflected from any target objects in the search volume 24, and integrates these "returns" 66 to form three dimensional images.

Operation of the present radar system is further described with reference to FIG. 5, a block diagram of the radar system. A timer 70 transmits a series of pulses at a selected pulse repetition frequency to provide timing for the radar system. This pulse repetition frequency may be varied using a pseudorandom number generator (not shown). This reduces potential RF interference to and from other electronic equipment.

Conventional impulse generators 72a, 72b associated with respective transmitting antennas 52a, 52b produce impulses when triggered by the timer 70 pulses. The impulse generators preferably have jitter characteristics significantly less than their pulse width. These impulses are e.g. 5 nanoseconds or wider for a radar system that is searching for large, deep targets, or e.g. 100 picoseconds or shorter for a system that is searching for small targets. The peak power output by each impulse generator 72a, 72b may be e.g. as low as a few milliwatts, or as high as several hundred kilowatts. For low power requirements, each impulse generator 72a, 72b is e.g. a conventional diode pulse shaper or rapid rise (or fall) time voltage transition, but for higher power, a current technology for producing very short impulses at high peak power levels, such as photoconductive switch may be used.

Each impulse generator 72a, 72b applies the transmit pulse to a respective transmitting antenna 52a, 52b. The antennas 52a, 52b are of a type that support impulse rather than conventional carrier-based radar systems. These antenna types include TEM horns, resistively loaded dipoles, and others especially designed for impulse radar systems to minimize distortion of the transmitted pulses. The beamwidth of the transmitting antennas 52a, 52b is sufficient to cover the entire active "matrix" of pixels 62 in FIG. 4 in the current swath of the search volume 24, where target 30 is located somewhere in volume 24.

The return signals 66 are collected by the receiving antennas(s) 56a, 56b which may be e.g. the same type as the transmitting antennas, and coupled to associated respective wideband video amplifiers 78a, 78b. Amplifiers 78a, 78b pass and amplify the entire frequency spectrum of the return signal 66, which is a function of the pulse width of the transmit pulse 64. These amplifiers may be required to raise the input signal to a level suitable for sampling or A/D (analog-to-digital) conversion. In order to support the wide range of signal levels, the amplifier's gain may be varied with range so the amplitude variation of the returned signals versus distance is reduced. The analog output signal from the amplifiers 78a, 78b is converted to digital form by conventional analog to digital converters 82a, 82b respectively which convert at rates adequate to define the received signal. Typically, a converter 82a, 82b sampling time less than one half of the transmit pulse width is desired in order to provide adequate resolution to support the required image processing. In general, the narrower the sample pulse in relationship to the transmitted pulse and the number of sample pulses utilized to reconstruct the received signal increases the system imaging fidelity.

The digital output signals from the analog to digital converters 82a, 82b are coupled to a signal processor circuit 88, which is e.g. a programmed microprocessor, or computer, or dedicated digital processing circuitry which forms three dimensional images from the return signals. Input signals from a navigation or location system 92 provide information on the position of the antenna array 50 with respect to the active matrix of pixels 62 of the current swath of the search volume 24 to assist signal processing and to provide mapping information. For an airborne radar, instantaneous vehicle position, altitude, pitch, roll and heading data are used to calculate the position of each appropriate transmit and receive antenna when a pulse is transmitted to determine the signal path length to each pixel as part of the signal processing. For a portable, hand-held system, a location system could be just an encoder to provide single axis position of the antenna array as the array is moved across the surface.

A display 96 in one embodiment provides resulting three-dimensional images of target(s) 30 detected by the radar system. The display 96 utilizes e.g. color imagery to indicate target 30 intensity, side or position. A digital data recorder 100 is utilized in some embodiments to record digital return data for non-real time processing.

Operation of the radar system can be further understood through a description of the data collection and signal processing by signal processor 88 for an exemplary airborne radar system for medium resolution and deep depth capability. This specific embodiment is intended to operate from a helicopter flying at 25 knots, 50 feet above the ground. This radar system has two transmitting and three receiving antennas as in FIG. 3 each spaced six feet apart for a total array span of 24 feet. (It is to be understood that in general the antenna array 50 has N transmitting antennas and M receiving antennas, where N and M are each at least equal to one.)

For the data collection process, the first transmitting antenna 52*a* emits a one nanosecond long pulse. The resulting return 66 from this pulse from target 30 is received by each of the three receiving antennas 56*a*, 56*b*, 56*c*, then amplified by associated amplifiers of the type 78*a*, 78*b* in FIG. 5 and digitized by the associated analog to digital converters of the type 82*a*, 82*b* in FIG. 5. The timer 70 instructs the A/D converters 82*a*, 82*b* to initiate conversion just prior to the return of the first signal from the search volume 24 so as to not sample or process any excess data from ranges less than those from the aircraft platform to the search volume 24. The converters 82*a*, 82*b* sample the return from this time every 0.5 nanosecond for a period of 200 nanoseconds, or 400 samples. This timing adjusts for the altitude of the vehicle carrying the antenna array 50 and assures that the return from all pixels has been digitized. The resulting digital output signal is a data string consisting of a series of 400 words (e.g. 10 bit digital numbers) that represent the magnitude of the received signal at the sampling rate of the analog to digital converters.

This string is sent to the signal processor 88 where it is stored in a memory location that identifies the specific transmitting-receiving antenna pair and can be stored in a data recorder 100 for later processing. The position of each word in the data string represents the sampling time that has elapsed since the pulse was transmitted, and the value of the word indicates the magnitude of the return signal 66 at that time. This operation is conducted simultaneously by the three receiving antennas, resulting in three separate data strings stored in separate memory locations. A short time period after the first impulse (e.g. 10 microseconds) so as to avoid effects of the first impulse, this entire sequence is repeated with the second impulse generator 72*b* transmitting a pulse and the return to the three receiving antennas is collected, digitized and sent to the signal processor. For a radar system with an antenna array 50 having two transmitting antennas 52*a*, 52*b* and three receiving antennas 56*a*, 56*b*, 56*c*, there will be six data strings representing this sequence.

In increments of e.g. five feet of forward travel (approximately 15 milliseconds for a forward velocity of 25 knots), this entire process is repeated, resulting in six additional sets of data stored in new memory locations. This forward travel increment is chosen to result in approximately equal resolution for both cross and long (travel direction) path dimensions.

The signal processing includes identifying the portion of the return signals that represent each pixel and summing the magnitudes of these portions. This identification and summation is conducted for each of the individual pixels. This process is carried out e.g. by a computer program resident in signal processor 88. Coding such a computer program would be well within the skill of one of ordinary skill in the art in the light of this disclosure. The result is an image consisting of a three dimensional matrix that identifies the integrated value of the return from each pixel. After each collection of the six sets of data described above, the following sequence occurs for each of the 576,000 pixels in the active matrix.

The round trip delay from the first transmitting antenna to the pixel and then to the first receiving antenna is calculated by the signal processor 88. In the case of the airborne system, inputs from the vehicle navigation system 92 including position, altitude, pitch, roll, and yaw are utilized to calculate the exact position of the specific transmitting and receiving antennas at the time the pulse is transmitted. The signal delay includes calculations that consider the path dispersion and propagation delay introduced by transmission through soils or materials where the velocity of propagation is reduced compared to air.

The signal processor 88 retrieves the digital word corresponding to this calculated delay from the stored digital string that represents the return from this sequence. This word which reflects the received signal amplitude corresponding to the specific pixel is placed in a digital word at a new memory location that represents the specific pixel. Calculations are conducted for each of the pixels in the active matrix and the results are entered into memory locations that represent each pixel. This process is repeated for each of the six transmitting-receiving antenna pairs corresponding to a given position along the flight path. The magnitudes of the six words are added into the word at the pixel memory location. These six additions of the transmitting-receiving antenna pair data provide antenna array gain and resolution in a direction across the path of the vehicle.

After the antenna array 50 has travelled forward, e.g. five feet, the process is repeated. Pixels 62 which were in the front of the active array will have a second magnitude added to the corresponding value stored in the memory. When the antenna array 50 has passed completely over a particular pixel 62, it will have had six magnitudes added to the content of the corresponding memory location. This integration of signals along the direction of motion for each pixel (shown in FIG. 4) provides what is conventionally called synthetic array beam processing, equivalent to a series of six antenna arrays. The six positions where data is collected define synthetic antenna arrays at these locations.

The combination of real aperture and synthetic aperture array processing provides 31 (20 log (6×6)) dB gain compared to the single antenna element gain. This results in narrow array beam widths and high effective radiated power, improving resolution and soil penetration capabilities.

The signal processor 88 develops a three dimensional map using the magnitude of the summed returns of each pixel 62 to determine colors. Although each individual calculation is not complex, the system supports a rate of six calculations per pixel at a rate of 409,000 pixels per second, or 2.5 million calculations per second. The process is suitable to parallel processing or specialized digital signal processors.

The result in terms of data is a set of memory locations, one location corresponding to each pixel, that each stores data representing the magnitude of the integrated (summed) signal for that pixel. Additional processing, such as smoothing pixel-to-pixel magnitudes, or correlation techniques may be utilized to provide sharper images or increase the signal to noise ratio.

This pixel data can be displayed e.g. on color CRT or LCD display 96, where the pixel magnitude establishes a particular assigned color and the pixel location determines the position on the display.

The foregoing example is for a medium target size search system. The sampling rate requirement for the one nanosecond pulse duration is about one half nanosecond or less to provide adequate detail to permit satisfactory construction of the image. This sampling rate is within the capabilities of currently available analog to digital converters 82a, 82b. For high resolution radar systems which may have a pulse width of 100 picoseconds or less, current analog to digital converters may not be suitable, so the following approach is utilized in some embodiments.

Figure 5:
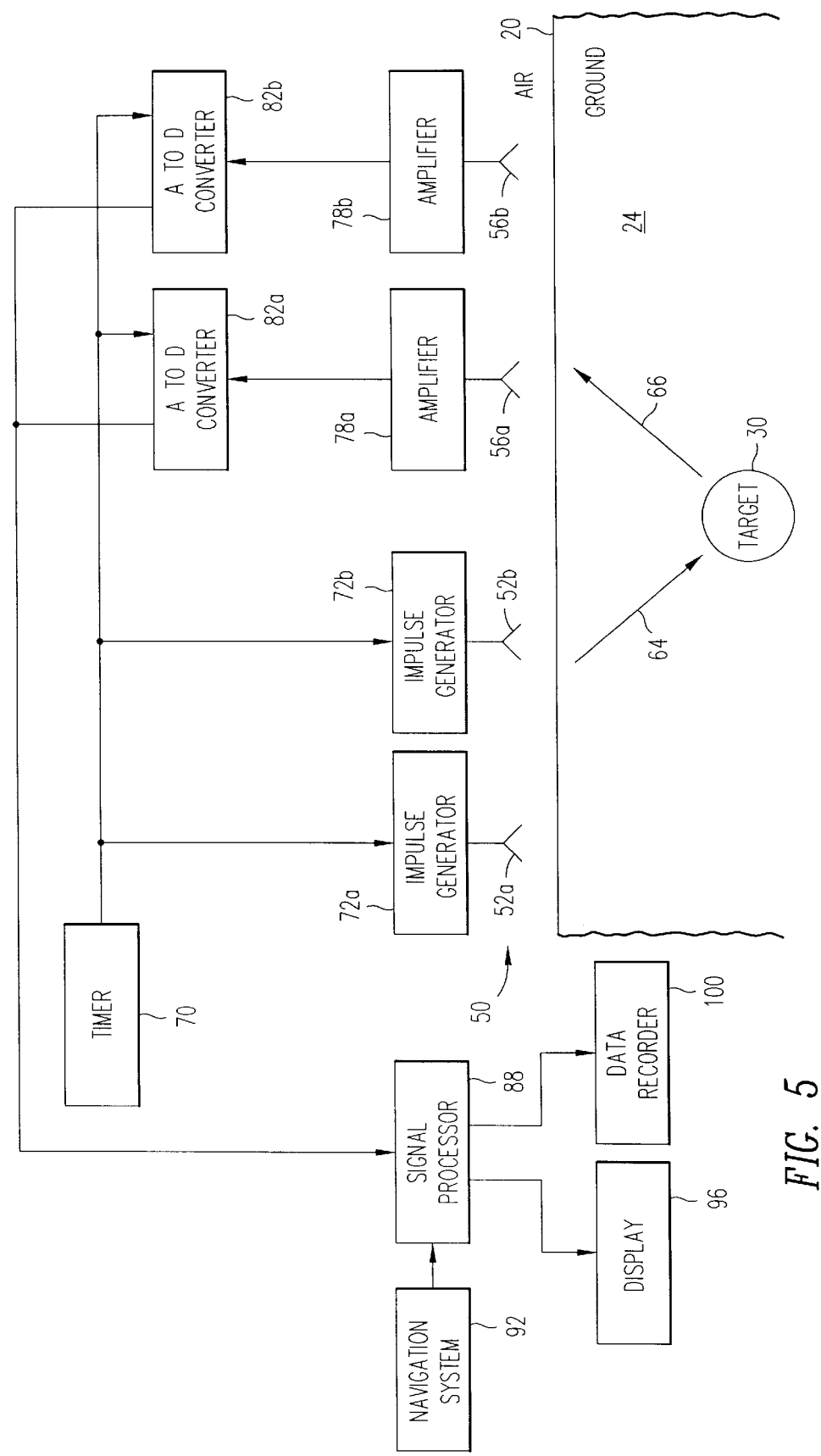
FIG. 5 is a block diagram of the present system.
Figure 6:
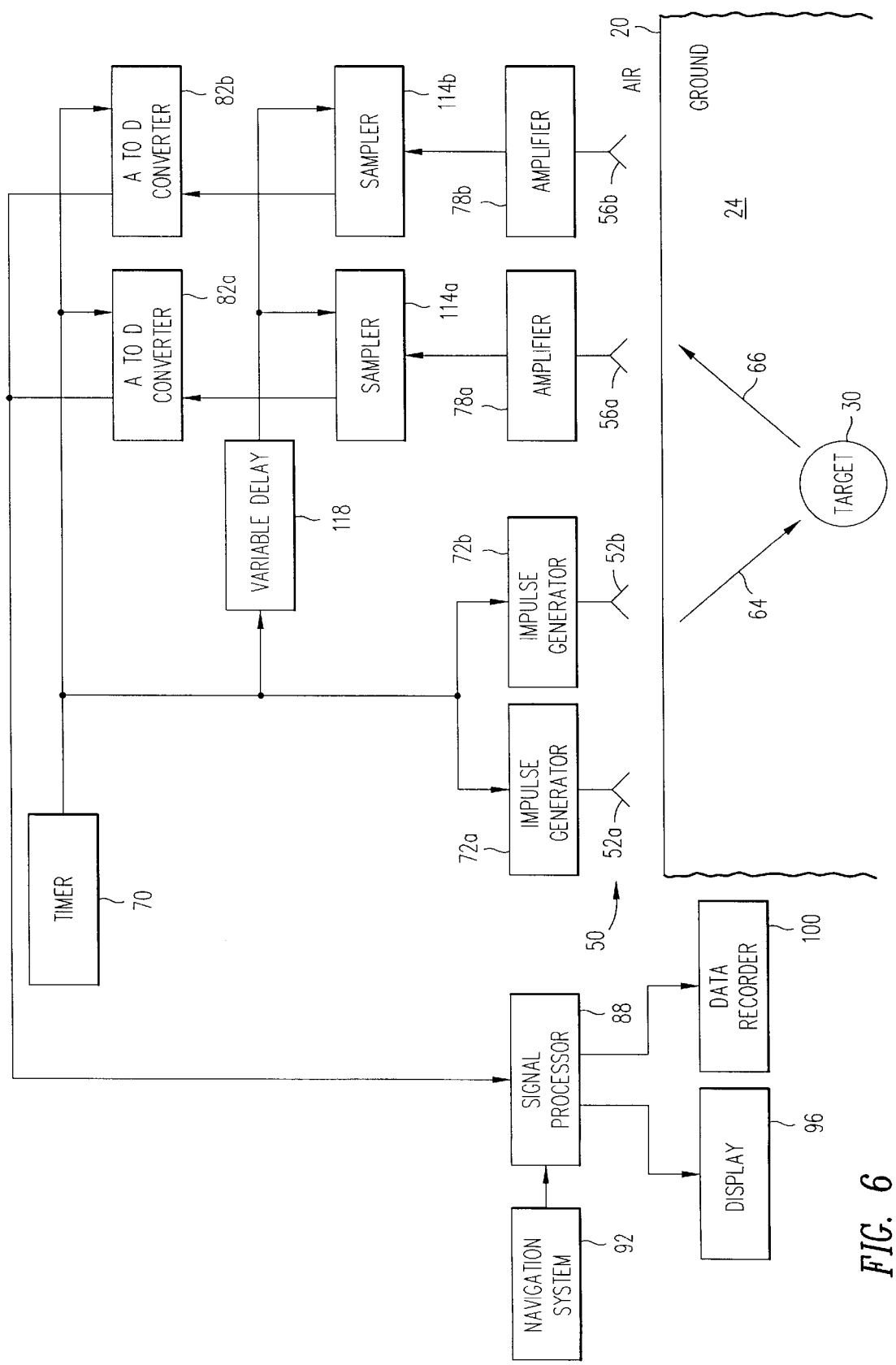
FIG. 6 is a block diagram of a variation of the FIG. 5 system with a variable receiving delay.

FIG. 6 shows another embodiment providing high sampling rates with most elements the same as in FIG. 5. Rather than requiring the analog-to-digital converters 82a, 82b to have a very high sample rate as in the previously described system, in this approach high speed samplers 114a, 114b sample the output of the associated amplifier 78a, 78b and hold their outputs after sampling until the outputs can be digitized by the associated A/D converter 82a, 82b. A variable delay circuit triggers each receive channel sampler 114a, 114b and the delay time, under the control of the timer 70, steps by an amount analogous to the sample rate in the FIG. 5 system. This allows the A/D converters 82a, 82b to operate at a much slower rate, thus using lower cost A/D converters. In addition, the samplers 114a, 114b can achieve a much higher equivalent sample rate for much lower cost than current state-of-the-art A/D converters; a 100 picosecond sampler can be built inexpensively, giving a 10 GHZ equivalent sample rate while a 10 GHZ A/D converter is not currently commercially available. This higher sample rate allows higher spatial resolution.

As an example, a series of 200 impulses with pulse widths of 200 picoseconds is transmitted with an interpulse spacing of one microsecond. A variable delay circuit 118 outputs pulses with a delay that increases from the first pulse from the timer 70 by a fixed amount for each successive pulse in the series. For example, for a high resolution system, if the desired sampling period is 100 picoseconds, the output pulse from the variable delay circuit 118 is delayed for an additional period of 100 picoseconds after each transmitted pulse in the series. If the initial delay is 600 picoseconds, the delay for the first pulse would be 600 picoseconds, the second pulse would be 700 picoseconds and the delay of each output pulse would increase until the last pulse would be delayed by 20.5 nanoseconds. The result is a series of digital words that represent the amplitude of the returned signal every 100 picoseconds starting from 600 picoseconds to 20.5 nanoseconds.

Figure 7:
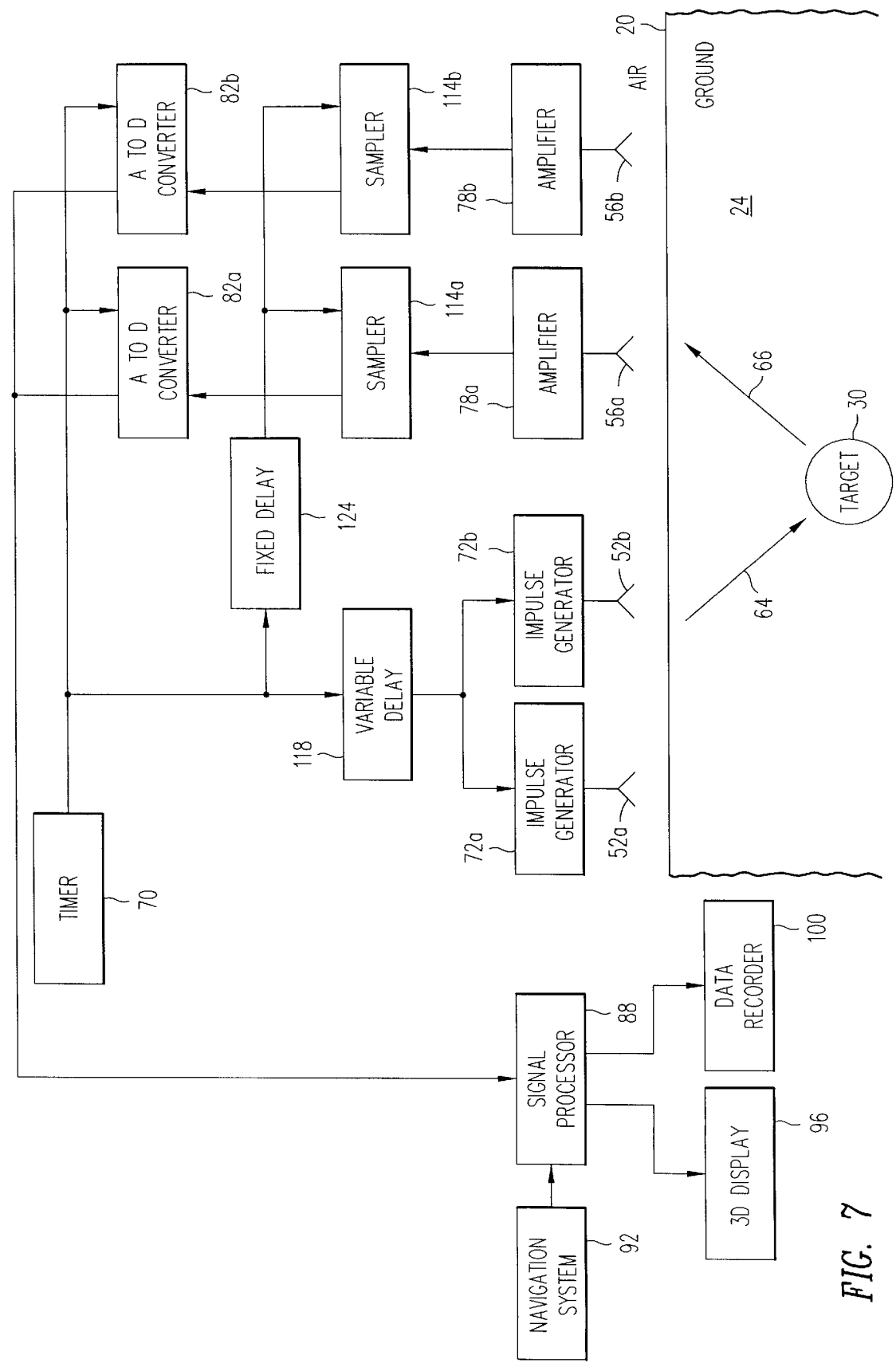
FIG. 7 is a block diagram of a variation of the FIG. 5 system with a variable transmission delay.

An alternative but similar approach shown in FIG. 7 utilizes the variable delay circuit 118 to provide a variable delay between transmit pulses, and keeps the delay to the samplers 114a, 114b constant by a fixed delay circuit 124. The samplers 114a, 114b will then sample at varying periods after the transmitted pulse, depending on the transmit pulse delay.

Changes and modifications to the specifically described embodiments can be carried out without departure from the scope of the invention which is intended to be limited only by the scope of the claims.

We claim:

1. An impulse radar system comprising:
   a timer;
   at least one impulse generator coupled to the timer;
   at least one transmitting antenna connected to the at least one impulse generator;
   at least one receiving antenna spaced apart from the at least one transmitting antenna;
   an analog to digital converter coupled to the at least one receiving antenna;
   a signal processor coupled to the analog to digital converter; and
   a display coupled to the signal processor.

2. The radar system of claim 1, wherein the signal processor performs synthetic aperture beam processing by motion of the transmitting antenna and receiving antenna relative to a target.

3. The radar system of claim 1, wherein each impulse generator transmits pulses independently by an associated transmitting antenna, and a signal reflected from a target is collected by the receiving antenna.

4. The radar system of claim 1, wherein a received signal from a target is processed by the signal processor by integrating a received signal from all the receiving antennas through time correlation.

5. The radar system of claim 1, wherein a sampler is coupled between the at least one receiving antenna and the analog to digital converter.

6. The radar system of claim 1, wherein the timer has a pulse repetition rate which varies randomly.

7. The radar system of claim 1, further comprising a recorder for storing received signals from the receiving antennas for later processing.

8. The radar system of claim 1, wherein the transmitting antenna transmits radar pulses which penetrate at least one of water, earth, and structures.

9. The radar system of claim 1, wherein the system is a mobile system.

10. The radar system of claim 1, wherein the system is a human portable system.

11. The radar system of claim 1, wherein the system is an airborne system.

12. The radar system of claim 1, wherein there is more than one receiving or transmitting antenna.

13. The radar system of claim 1, further comprising a variable delay circuit coupled between the timer and the impulse generator.

14. The radar system of claim 1, further comprising:
   a locator coupled to the signal processor for determining a location of the transmitting and receiving antennas.

15. The radar system of claim 14, wherein the signal processor determines an instantaneous position of the transmitting antenna and receiving antenna from the locator, thereby to determine the signal path length to a particular pixel in the search volume.

16. The radar system of claim 1, wherein the signal processor forms a three dimensional image of the search volume.

17. The radar system of claim 1, wherein the signal processor identifies a return signal from the search volume received by the receiving antenna from each pixel in the search volume as the radar system moves relative to the search volume, and sums the return signals received from each pixel.

18. The radar system of claim 1, further including a second transmitting or receiving antenna, thereby defining a plurality of transmitting-receiving antenna pairs, wherein the signal processor identifies a return signal from the search volume received by each receiving antenna from each pixel in the search volume, and the signal processor sums the return signals for all the transmitting-receiving antenna pairs.

19. The radar system of claim 1, wherein the signal processor calculates a signal path length to each of a plurality of pixels in three dimensions in a search volume, and forms an image of the search volume on the display.

20. A method for detecting a target in a search volume comprising:

transmitting impulse radar pulses from an antenna array including at least one receiving and at least one transmitting antenna spaced apart from the receiving antenna;

receiving a return of the transmittal pulse reflected from the target at the antenna array; and for each of a plurality of pixel locations in the search volume, accumulating a digital signal representing the return from that location over all the antenna pairs while translating the antenna array across the search volume, thereby providing an indication of a location of the target.

21. The method of claim 20, wherein translating the antenna array includes at least one of manually transporting the antenna array, carrying the antenna array in an aircraft, and carrying the antenna array in a vehicle.

22. The method of claim 20, wherein the accumulating includes sampling the return.

23. The method of claim 20, wherein the transmitting includes randomly varying a repetition rate of the radar pulses.

24. The method of claim 20, wherein the search volume indicates at least one of a volume of earth, water, and a structure.

25. The method of claim 20, wherein there is more than one receiving or transmitting antenna in the array.

26. The method of claim 20, further comprising the providing a variable delay to one of the steps of transmitting or receiving.

27. The method of claim 20, wherein the search volume is a three dimensional search volume.

28. The method of claim 20, wherein the providing an indication of a location of the target further comprises calculating a signal path length to each of the locations in the search volume for each antenna pair, collecting and digitizing a signal representing the path length, and summing the digitized signals for all the antenna pairs.

29. The method of claim 28, wherein the antenna array includes a second transmitting or receiving antenna, thereby defining a plurality of transmitting-receiving antenna pairs.

* * * * *